(12) United States Patent
Yoshio et al.

(10) Patent No.: US 6,322,922 B1
(45) Date of Patent: Nov. 27, 2001

(54) SEALED BATTERY AND METHOD FOR MANUFACTURING SAME

(75) Inventors: Hideaki Yoshio, Moriguchi; Seiichi Mizutani; Shinji Tsurutani, both of Hirakata; Saburo Nakatsuka, Kyoto; Mamoru Iida, Kadoma, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/387,698

(22) PCT Filed: Jan. 11, 1999

(86) PCT No.: PCT/JP99/00061

§ 371 Date: Aug. 31, 1999

§ 102(e) Date: Aug. 31, 1999

(87) PCT Pub. No.: WO99/35699

PCT Pub. Date: Jul. 15, 1999

(30) Foreign Application Priority Data

Jan. 12, 1998 (JP) .................................................. 10-003670

(51) Int. Cl.[7] .............................. H01M 2/04; H01M 2/08

(52) U.S. Cl. ............................ 429/57; 429/164; 429/174; 429/185; 429/186

(58) Field of Search ................................ 429/56, 57, 171, 429/175, 185, 174, 186

(56) References Cited

U.S. PATENT DOCUMENTS

| | | | |
|---|---|---|---|
| 5,567,539 | * 10/1996 | Takahashi | 429/57 |
| 5,609,972 | * 3/1997 | Kaschmitter | 429/56 |
| 5,741,606 | * 4/1998 | Mayer | 429/53 |
| 5,776,627 | * 7/1998 | Mao | 429/61 |
| 5,776,791 | * 6/1998 | Takahashi | 429/57 |
| 5,985,479 | * 11/1999 | Boolish | 429/56 |

FOREIGN PATENT DOCUMENTS

| | | | |
|---|---|---|---|
| 58-112259 | 7/1983 | (JP) . | |
| 58-169659 | 11/1983 | (JP) . | |
| 2-44650 | 2/1990 | (JP) . | |
| 7-183020 | * 7/1995 | (JP) | H01M/2/12 |
| 7-235288 | * 9/1995 | (JP) | H01M/2/12 |

* cited by examiner

*Primary Examiner*—Carol Chaney
*Assistant Examiner*—Mark Ruthkosky
(74) *Attorney, Agent, or Firm*—Jordan and Hamburg LLP

(57) ABSTRACT

A metal reinforcing plate is welded in place close to the opening on the inside of the battery case, and a plastic insulation gasket and a sealing member provided with an anti-explosion mechanism or the like are sequentially mounted on the metal reinforcing plate. By this arrangement, higher battery capacity can be realized by eliminating the waste of space because it is unnecessary to form a conventional indentation around the upper wall of a battery case. A sealed battery construction having an anti-explosion mechanism and being highly reliable in terms of leakage prevention can be thereby obtained.

6 Claims, 2 Drawing Sheets

SEALED BATTERY AND METHOD FOR MANUFACTURING SAME

BACKGROUND

The present invention relates to a sealed construction for a sealed battery that uses a battery case reinforcing plate, and to a method for manufacturing the same.

The rapidly increasing use in recent years of power supplies for portable and cordless AV equipment, personal computers, portable communication devices, and other devices is driving research into making smaller and higher capacity non-aqueous electrolyte secondary batteries, such as high-capacity alkali storage batteries and lithium ion secondary batteries.

A battery sealing work procedure disclosed in Japanese Published Unexamined Patent Application (Kokai) 58-112259 is described hereafter.

FIG. 4 shows the construction of a conventional sealed battery. In FIG. 4, 1 is a battery case that also functions as a terminal plate, 2 is a plastic insulation gasket, 3 is a metal reinforcing plate that prevents deformation, such as denting or bulging, of the battery case, 4 is a metal cap that also functions as one of the battery terminals, and 5 is a sealing member in which an anti-explosion mechanism is incorporated.

After electricity-generating elements 6 are placed into the battery case 1, the reinforcing plate 3 is placed at a specified position from the opening of the battery case 1 and then fixed in place using laser welding or another method. Next, a drawing die of a specified shape is used to gradually draw the circumference of the battery case 1 inward at a location closer to the opening than the fixed position of the reinforcing plate 3 and to form a circumscribing indentation 7 around the circumference. The indentation 7 is for supporting from beneath the plastic insulation gasket 2 and the sealing member 5. After the inside surface of the battery case 1 from the above-mentioned indentation 7 to the edge of the opening is coated with a sealant such as blown asphalt, the plastic insulation gasket 2, which has been previously coated on the inside with blown asphalt, and the above-mentioned sealing member 5 are placed on the indentation 7, and the edge 1a of the battery case 1 is compression-formed and sealed by a crimping die while the above-mentioned indentation 7 is preserved.

In the above sealed battery, however, the indentation 7 is provided in the battery case 1 using a drawing process to provide a resting place for the plastic insulation gasket 2 and the sealing member 5, as well as to mitigate the compression pressure that is applied when the battery case 1 is crimped. This reduces the effective capacity of the battery case 1, which makes it difficult to achieve high electric capacity.

It is also difficult to form the above-mentioned indentation 7 with stability, which means that the surface on which the plastic insulation gasket 2 and the sealing member 5 are rested is not necessarily completely flat at all times, causing problems such as deformation of the reinforcing plate 3 or creating a non-uniform shape during crimping. This also makes it difficult to avoid defects that allow the sealed electrolyte to leak out.

SUMMARY OF THE INVENTION

An object of the present invention is to provide a sealed battery in which higher battery capacity can be achieved by removing from a battery case of constant size any unnecessary space needed other than the space for accommodating electricity-generating elements, and a sealing member with an anti-explosion mechanism, and a sealed construction that remains highly reliable in terms of leakage prevention.

A sealed battery of the present invention comprises a metal reinforcing plate welded in place close to the opening on the inside of a battery case, and a sealing member obtained by combining a plastic insulation gasket, and a battery anti-explosion mechanism, and mounted on the above-mentioned metal reinforcing plate.

Because this arrangement makes forming an indentation in the battery case unnecessary, it is possible to provide a battery in which the wasted space inside the case can be eliminated, higher battery capacity can be achieved, and high reliability in terms of leakage prevention can be maintained.

DETAILED DESCRIPTION

Figure 1:
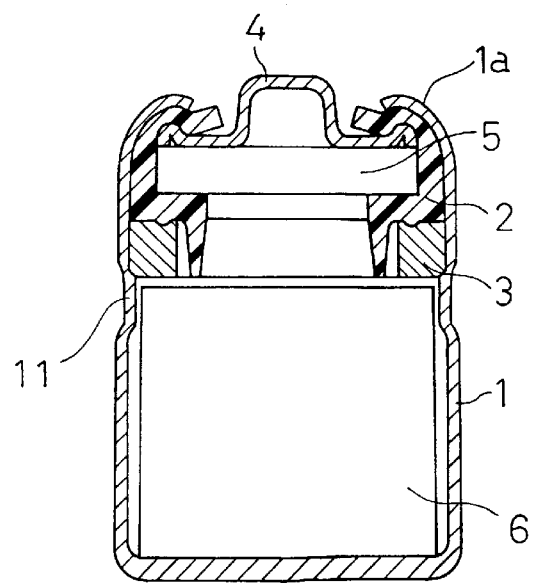
FIG. 1 is a sectional view of a sealed battery of the present invention.

In a sealed battery shown in FIG. 1, a metal reinforcing plate 3 for preventing deformation of a battery case 1 is welded in place at a specified position near the opening on the inside of the battery case 1, which is open at the top. A plastic insulation gasket 2 and a sealing member 5 are sequentially mounted on this metal reinforcing plate 3.

Figure 2:
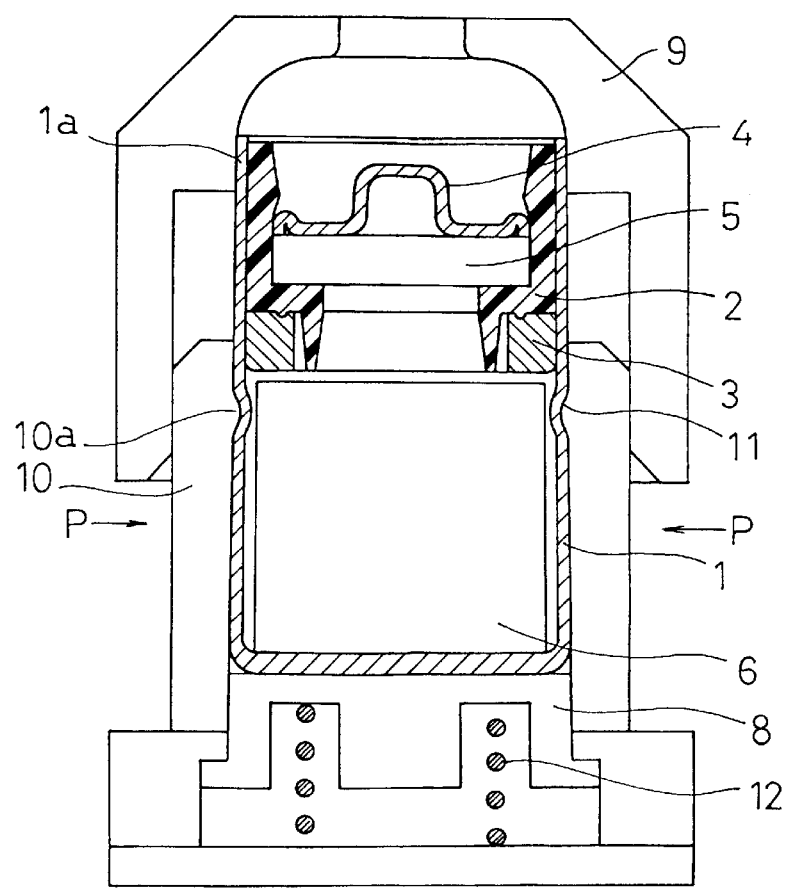
FIG. 2 is a sectional view of the same battery in a state before the top edge of the battery case is crimped.

After electricity-generating elements 6 consisting of an electrode plate assembly and an electrolyte are placed inside the battery case 1, which is open at the top, the metal reinforcing plate 3, the upper surface of which is nearly perfectly level, is laser welded into place at a specified position near the opening of the battery case 1 to prevent deformation of the battery case 1. The sealing member 5 is set on top of the metal reinforcing plate 3 via the plastic insulation gasket 2 metal cap 4 is set on top of the sealing members via the plastic insulation gasket 2, and the upper edge 1a of the battery case 1 opening is sealed by being compression formed using a crimping die. In the sealing member 5, a current shut-off mechanism and an anti-explosion mechanism are incorporated, which are designed to deal with increases in the pressure inside the battery. As shown in FIG. 2, the bottom of the battery case 1 is supported by a support 8 to which a spring 12 applies an elastic force that is less than the battery case 1 compression buckling strength, and a case holding die 10 provided with a case holding protrusion 10a and separated into right and left halves is moved in the direction P of diameter reduction to hold the outside surface of the above-mentioned battery case 1. At this time the above-mentioned case holding protrusion 10a is positioned slightly below (0.2 mm to 3 mm) the position where the metal reinforcing plate 3 is welded to the inside of the battery case 1, causing the side of the battery case 1 to be slightly deformed by a minute amount less than the thickness of the case wall, and creating a minute deformation indentation 11 around the outside of the battery case 1.

Figure 3:
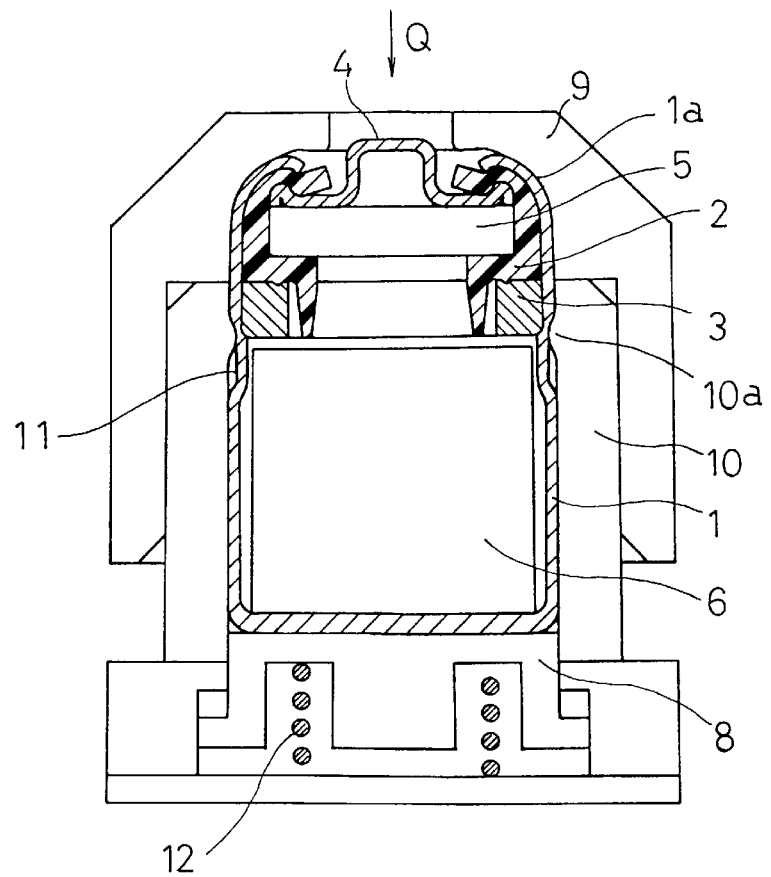
FIG. 3 is a sectional view of the same battery in a state after crimping.

With the battery case 1 held by the case holding die 10 as described above, a crimping die 9 of specified shape is lowered in the down direction Q to compression-form the opening top edge 1a of the above-mentioned battery case 1 as shown in FIG. 3. In other words, when a compression force is applied by the crimping die 9, the battery case 1 is compression formed as shown in FIG. 3 such that the battery case moves to and stops at a position where the compression force from the crimping die 9 is received at an equilibrium point by the above-mentioned case holding protrusion 10a, that is, in the proximity of the bottom of the above-mentioned metal reinforcing plate 3, and the open top edge 1a of the battery case 1 is bend inwards while the metal reinforcing plate 3 is supported by the case holding protrusion 10a via the battery case 1.

Figure 4:
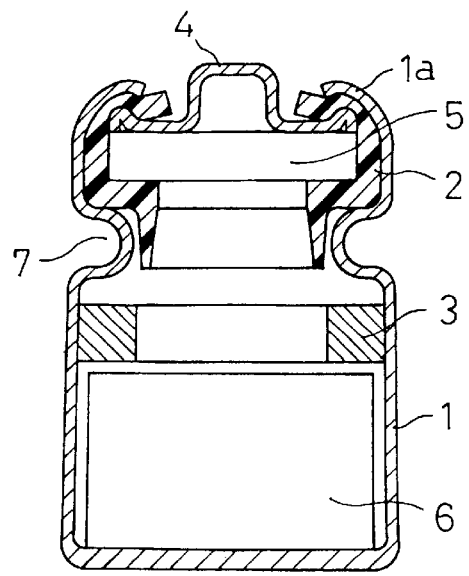
FIG. 4 is a sectional view of a conventional sealed battery.

Stable compression forming can therefore be effected by the crimping die without the battery case 1 being bent by the pressure during compression forming. Further, this eliminates the conventional necessity of forming an indentation 7 (FIG. 4) in the battery case 1 to hold the sealing member 5, eliminates the waste of space inside the battery case 1, and allows for compression forming using the top of the substantially perfectly level metal reinforcing plate 3 in place of a base support. This not only provides for the stable formation of the top of the battery case 1 but also prevents deformation of the sealing member 5.

This arrangement is especially effective when used for battery cases having an oval cross section.

The present invention as described above comprises a metal reinforcing plate welded in place close to the opening on the inside surface of a battery case to prevent deformation of the case, and a plastic insulation gasket and a sealing member sequentially mounted on this metal reinforcing plate, and is thus effective as a means for eliminating the waste of space inside the case to achieve a high-capacity battery.

Furthermore, because the battery case can be compression-formed in a stable manner, it is possible to construct an improved anti-explosion mechanism for the battery and to achieve higher reliability in terms of leakage prevention.

What is claimed is:

1. A sealed battery containing electricity generating elements, comprising:
    a battery case having an opening and an inner side wall;
    a sealing member;
    an insulation gasket; and
    a metal reinforcing plate positioned within said battery case, wherein said metal reinforcing plate is fixed only on the inner side wall of said battery case, and said insulation gasket and said sealing member are sequentially mounted on top of said metal reinforcing plate.

2. The sealed battery according to claim 1, wherein an anti-explosion valve is incorporated in said sealing member.

3. The sealed battery according to claim 1, wherein said battery case has an inwardly crimped top edge for sealing said sealed battery.

4. The sealed battery according to claim 1, wherein said sealed battery has an oval-shaped horizontal cross section.

5. A method for manufacturing a sealed battery, comprising the steps of:
    disposing electricity-generating elements in a battery case;
    welding a metal reinforcing plate inside of said battery case;
    mounting an insulation gasket and a sealing member on top of said metal reinforcing plate;
    holding said battery case by moving a case holding die, divided into right and left halves and formed with case holding protrusions, in a direction of diameter reduction such that said case holding protrusions are situated below adjacent to said metal reinforcing plate; and
    moving a crimping die downwards, onto an open top edge of said battery case to compress and bend inward said open top edge.

6. The sealed battery according to claim 1 wherein a current shut-off mechanism is incorporated in said sealing member.

* * * * *